United States Patent
Shotey et al.

(10) Patent No.: US 7,619,163 B1
(45) Date of Patent: *Nov. 17, 2009

(54) ELECTRICAL DEVICE COVER

(75) Inventors: Marcus J. Shotey, Scottsdale, AZ (US);
Jeffrey P. Baldwin, Phoenix, AZ (US);
Richard L. Cleghorn, Tempe, AZ (US);
Andre Baca, Phoenix, AZ (US);
Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/780,839

(22) Filed: Jul. 20, 2007

Related U.S. Application Data

(63) Continuation-in-part of application No. 11/557,580, filed on Nov. 8, 2006, now Pat. No. 7,381,894.

(60) Provisional application No. 60/950,661, filed on Jul. 19, 2007, provisional application No. 60/825,254, filed on Sep. 11, 2006, provisional application No. 60/734,858, filed on Nov. 8, 2005.

(51) Int. Cl.
*H02G 3/14* (2006.01)

(52) U.S. Cl. .......................... 174/67; 174/66; 174/135; 220/241

(58) Field of Classification Search .................. 174/66, 174/67, 50, 58, 559, 135; 220/241, 242; 439/553, 538; 33/528; D8/353; D13/177; 200/333

See application file for complete search history.

(56) References Cited

U.S. PATENT DOCUMENTS

| | | | |
|---|---|---|---|
| 2,458,153 A | 1/1949 | Festge | |
| 2,916,733 A | 12/1959 | Hirsch | |
| 3,449,706 A | 6/1969 | Carissimi | |
| 4,634,015 A | 1/1987 | Taylor | |
| 4,803,307 A | 2/1989 | Shotey | |
| 4,988,832 A | 1/1991 | Shotey | |
| 5,042,673 A | 8/1991 | McShane | |
| 5,485,356 A * | 1/1996 | Nguyen | 362/95 |
| 5,527,993 A | 6/1996 | Shotey et al. | |
| 5,763,831 A | 6/1998 | Shotey et al. | |
| 6,133,531 A | 10/2000 | Hayduke et al. | |
| 6,441,307 B1 | 8/2002 | Shotey et al. | |
| 6,476,321 B1 | 11/2002 | Shotey et al. | |
| 6,723,922 B1 | 4/2004 | Shotey et al. | |
| 6,761,582 B1 | 7/2004 | Shotey et al. | |
| 6,770,816 B2 | 8/2004 | Shotey et al. | |
| 6,794,575 B1 * | 9/2004 | McBain et al. | 174/67 |
| 6,894,223 B1 | 5/2005 | Shotey et al. | |
| 6,979,777 B2 | 12/2005 | Marcou et al. | |
| 6,987,225 B2 | 1/2006 | Shotey et al. | |
| 7,038,131 B1 | 5/2006 | Gretz | |
| 7,494,371 B2 * | 2/2009 | Kidman | 439/536 |
| 7,495,171 B2 * | 2/2009 | Gorin et al. | 174/66 |
| 2005/0197019 A1 | 9/2005 | Shotey et al. | |

* cited by examiner

*Primary Examiner*—Dhiru R Patel
(74) *Attorney, Agent, or Firm*—Booth Udall, PLC

(57) ABSTRACT

A cover for electrical devices is disclosed. Particular implementations include an electrical device cover configured to mount over an electrical device includes a lid having a flexible membrane. The lid is coupled by a hinge to a base and the cover includes a cord port in an edge of a surface of the cover. The lid is configured to expand through the flexible membrane to an expanded position to accommodate an electrical connector coupled with the electrical device. The lid may also be configured to reduce in depth as the lid retracts from the expanded position to a retracted position through the flexible membrane.

22 Claims, 19 Drawing Sheets

ELECTRICAL DEVICE COVER

CROSS REFERENCE TO RELATED APPLICATIONS

This document is a continuation-in-part application of the earlier U.S. Utility patent application to Shotey et al. entitled "Electrical Device Cover," application Ser. No. 11/557,580, filed Nov. 8, 2006, now U.S. Pat. No. 7,381,894, which claimed the benefit of the filing date of U.S. Provisional Patent Application 60/734,858, entitled "Flexible Outlet Cover" to Baldwin which was filed on Nov. 8, 2005, and the benefit of the filing date of U.S. Provisional Patent Application 60/825,254, entitled "Collapsible In-Use Cover" to Shotey et al. which was filed on Sep. 11, 2006, the contents of all of which are hereby incorporated herein by reference.

This document claims the benefit of the filing date of U.S. Provisional Patent Application 60/950,661 to Shotey et al. entitled "Collapsible In-Use Cover," which was filed on Jul. 19, 2007, the disclosure of which is hereby incorporated herein by reference.

BACKGROUND

1. Technical Field

Aspects of this document relate generally to covers for electrical devices.

2. Background Art

Electrical devices are prone to exposure to water and other contaminants when mounted in locations such as exterior walls. Many different cover designs seek to shield the devices from weather-related contaminants while electrical connectors are or are not coupled with the devices. These cover designs are generally called "while-in-use" covers. Examples of typical electrical devices include receptacles, switches, and communication ports. Typical while-in-use cover designs include a base connected to a lid by a hinge.

SUMMARY

Aspects of this invention relate to covers capable of expansion and retraction for electrical devices.

In one aspect, an electrical device cover configured to mount over an electrical device includes a lid having a flexible element coupled along a majority of the perimeter of a lid ring. The lid ring is movably coupled by a hinge to a base. The electrical device cover also includes a cord port in an edge of a surface of the cover. The flexible element includes an expanded position wherein a majority of the flexible element is configured to extend beyond the lid ring to continuously enclose an electrical connector coupled with the electrical device. The lid ring may further include a top edge. The flexible element may also include a retracted position wherein a majority of the flexible element is contracted to a position at or beneath a plane substantially parallel to the top edge. In particular implementations, the flexible element may be a flexible membrane.

In another aspect, an electrical device cover configured to mount over an electrical device includes a lid having a flexible membrane. The lid is coupled by a hinge to a base and the cover includes a cord port in an edge of a surface of the cover. The lid is configured to expand through the flexible membrane to an expanded position to accommodate an electrical connector coupled with the electrical device. The lid may also be configured to reduce in depth as the lid is retracted from the expanded position to a retracted position through the flexible membrane.

In yet another aspect, particular implementations of an electrical device cover may include a base having a flexible element coupled along the majority of the perimeter of the base. The base is coupled by a hinge on a base ring to a lid and the cover may include a cord port in an edge of a surface of the cover. The cover may include an extended position wherein the base ring is extended through the flexible element which is configured to continuously enclose an electrical connector coupled with the electrical device.

For particular implementations of an electrical device cover with the foregoing aspects, the flexible element may further have at least one pleat. The flexible element may also include a front face and that front face may further include a hard element. The front face may also have at least one latching notch along an edge of the front face configured to couple with a latching projection on the lid ring.

In particular implementations, the at least one pleat may further comprise a pleat ridge aligned between two pleat valleys. In some implementations, the pleat ridge may be substantially centered between the two pleat valleys. In other implementations, the flexible element may include a lid face and the pleat ridge may be aligned off-center between the two pleat valleys toward the lid face. Some implementations may include pleats that are flange shaped.

In particular implementations of an electrical device cover, the lid may further have a front face coupled through a plurality of interlocking rings to a lid ring. A flexible sheath may be coupled with the lid ring and extend along the inner surface of the interlocking rings to the front face of the flexible element. In particular implementations, the cord port may include a channel angled toward the base.

In yet another aspect, implementations of an electrical device cover may include a lid having a lid face and a flexible element coupled to the lid face at a first end of the flexible element. A lid ring may be coupled to a second end of the flexible element and may be movably coupled by a hinge to a base. A cord port may be included in a surface of the cover. The flexible element may include an expanded position where a majority of the flexible element is configured to extend beyond the lid ring to continuously enclose an electrical connector coupled with the electrical device.

Implementations of an electrical device cover may include one, some, or all of the following:

The lid face may include a plurality of retaining projections extending therefrom and the first end of the flexible element may include a plurality of lid face mounting apertures therethrough disposed along a perimeter of the first end of the flexible element. The first end of the flexible element may be coupled to the lid face through insertion of the plurality of retaining projections into the lid face mounting apertures.

The first end of the flexible element may be coupled to the lid face by heat staking.

A retainer ring having a plurality of retaining holes may be coupled over the plurality of retaining projections after the plurality of retaining projections is inserted into the lid face mounting apertures.

The retainer ring and the first end of the flexible element may be coupled to the lid face by heat staking or sonic welding.

The first end of the flexible element may be coupled to the lid face by one of friction force, glue, adhesive, double-sided tape and Velcro®.

The second end of the flexible element may have a lid ring mounting pleat extending around a majority of a perimeter of the second end of the flexible element. The lid ring may further include a continuous ridge along a majority of a perimeter of the lid ring and the lid ring mounting pleat may be inserted over the continuous ridge. In other particular implementations, the lid ring may include a plurality of mounting prongs extending inwardly from the perimeter of the lid ring and the lid ring mounting pleat may be inserted over the plurality of mounting prongs.

The lid ring mounting pleat may be held to the plurality of mounting prongs or to the continuous ridge through one of friction force, glue, adhesive, double-sided tape, or Velcro®.

A retainer ring may be coupled along a majority of the perimeter of the lid ring over the lid ring mounting pleat.

The retainer ring may be coupled to the lid ring through one of glue, adhesive, or heat staking.

The retainer ring may be sonic welded to the lid ring.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with implementations of electrical device covers from this disclosure. Accordingly, for example, although particular bases, lids, and cord ports are disclosed, such bases, lids, cord ports and implementing components may comprise any shape, size, style, type, model, version, measurement, concentration, material, quantity, and/or the like as is known in the art for such bases, lids, cord ports and implementing components, consistent with the intended operation of an electrical device cover.

Figure 1:
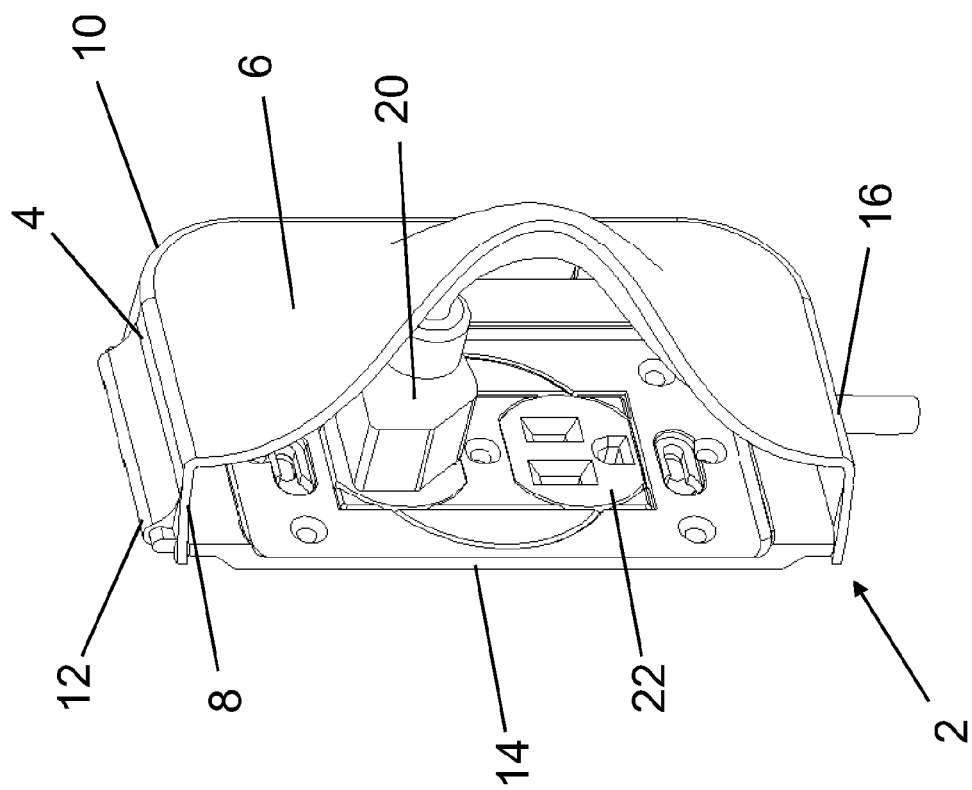
FIG. 1 is a perspective cross sectional view of an electrical device cover closed over an electrical connector in an expanded position.

FIG. 1 illustrates a sectional view of a particular implementation of an electrical device cover 2. The cover 2 may include a lid 4 which includes a lid ring 8 to which a flexible element 6 is coupled along the perimeter 10 of the lid ring 8. The lid 4 may be coupled to a base 14 through a hinge 12 and may include a cord port 16 in an edge of a surface of the cover 2. As illustrated, the cover 2 is mounted over an electrical device 22 and an electrical connector 20 is inserted into the electrical device 22. The flexible element 6 of the lid 4 illustrated in FIG. 1 is in an expanded position to accommodate the electrical connector 20 and when in the expanded position, may continuously enclose the electrical connector 20.

Figure 2:
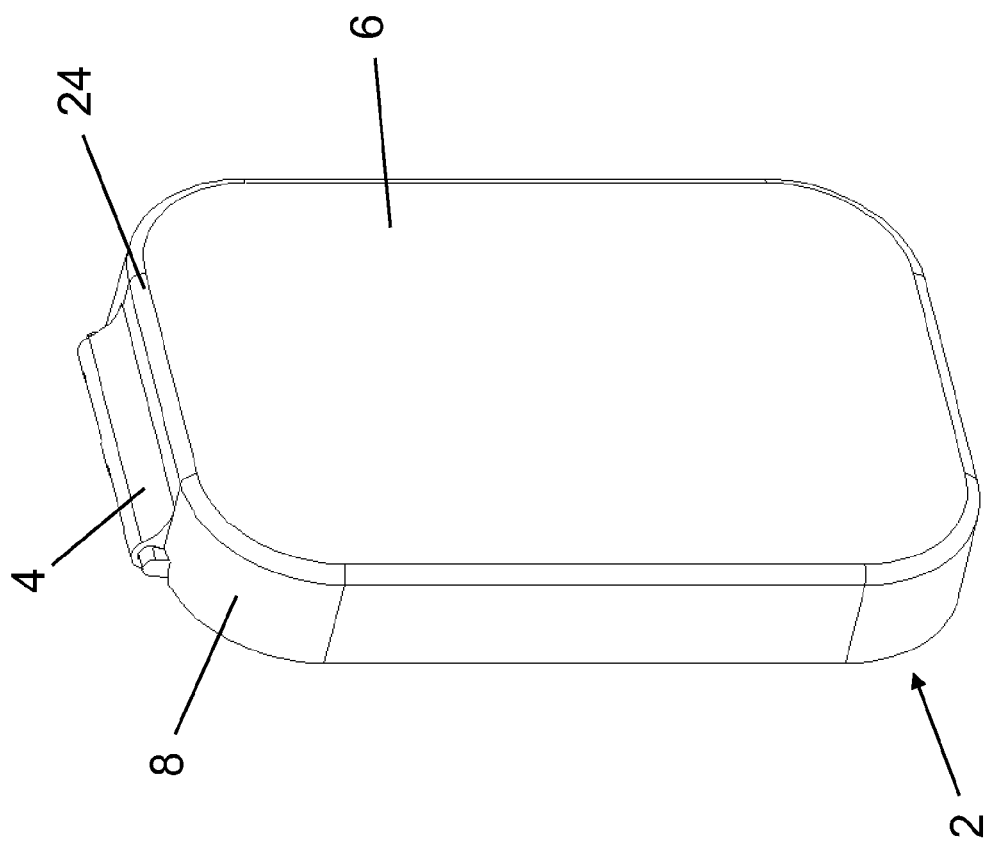
FIG. 2 is a perspective view of an electrical device cover closed over the base in a retracted position.

FIG. 2 illustrates the particular implementation of the electrical device cover 2 illustrated in FIG. 1 when the flexible element 6 is in a retracted position and the electrical connector 20 has been removed from the electrical device 22. In the implementation illustrated in FIG. 2, the lid ring 8 may include a top edge 24. When the flexible element 6 is in the retracted position, a majority of the flexible element 6 may be at or below a plane substantially parallel with the top edge 24. The ability of the lid 4 to expand and retract permits the electrical device cover 2 to increase or decrease in depth when the cover is in-use and not in use, respectively. This capability of the electrical device cover 2 allows it to operate as both a low profile cover (a cover of limited thickness) and a while-in-use cover. In the particular implementation illustrated in FIGS. 1 and 2, the cover, when in the low profile configuration, may range in depth from about 0.8 inches to about 1.75 inches. In other particular implementations of electrical device covers operating as low profile covers, the cover may be able to retract to a position about one-eighth to about three-quarters of its original depth when the cover is in the expanded position.

Figure 3:
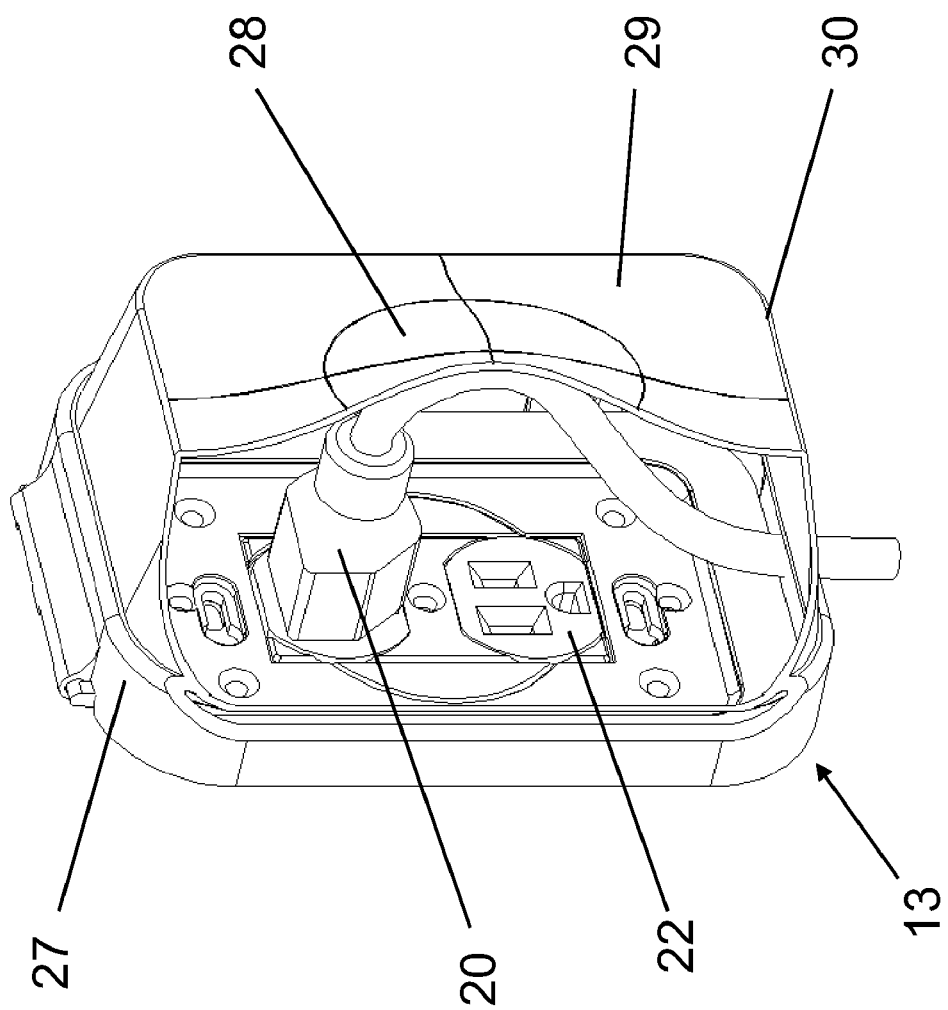
FIG. 3 is a cross section view of an electrical device cover in an expanded position.

In FIG. 3, a particular implementation of an electrical device cover 13 is illustrated where the lid 27 has a flexible element 28 and a front face 29. The front face 29 may also include a hard element 30 designed to resist expansion of the lid 27 when an electrical connector 20 is inserted into the electrical device 22 and the lid 27 is closed. As illustrated, the hard element 30 limits some of the expansion of the flexible element 28, but still allows the lid 27 to accommodate the electrical connector 20 when closed.

Figure 4:
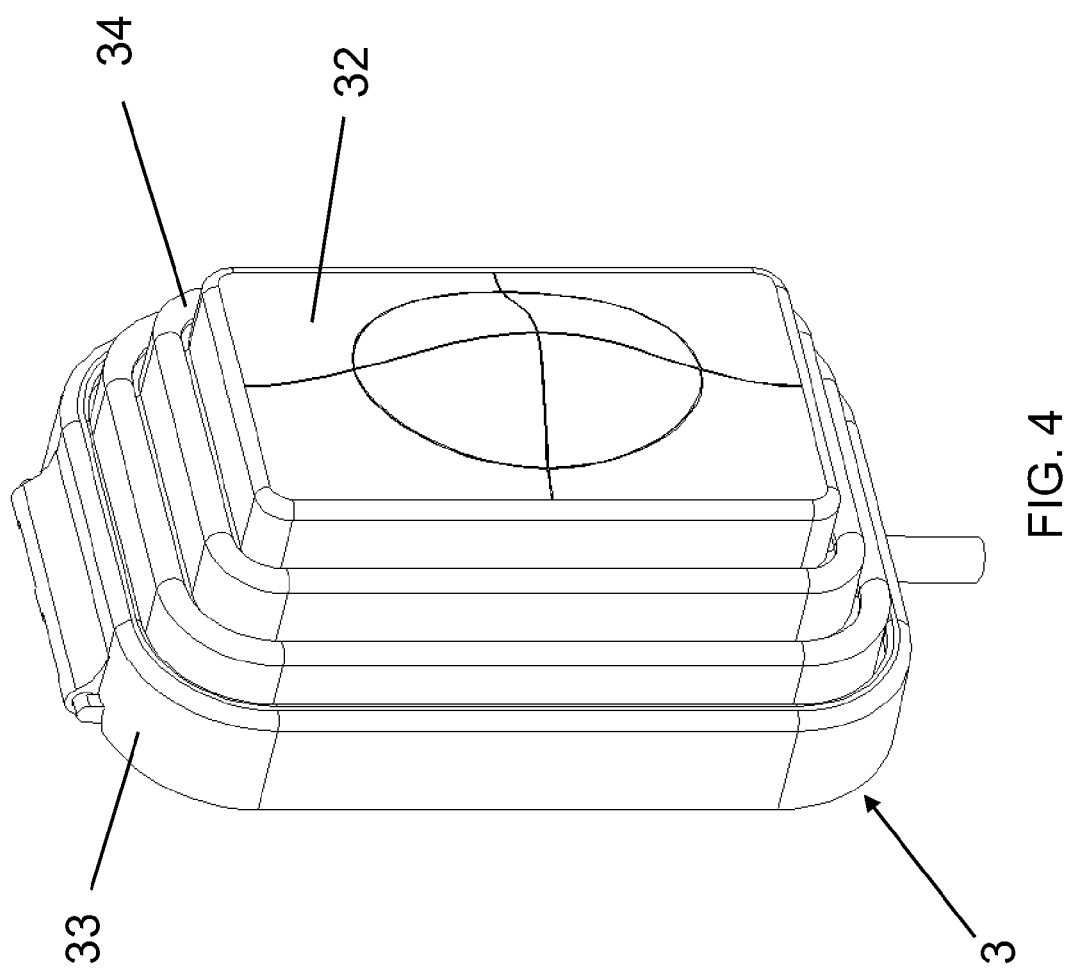
FIG. 4 is a perspective view of an electrical device cover including pleats in an expanded position.
Figure 5:
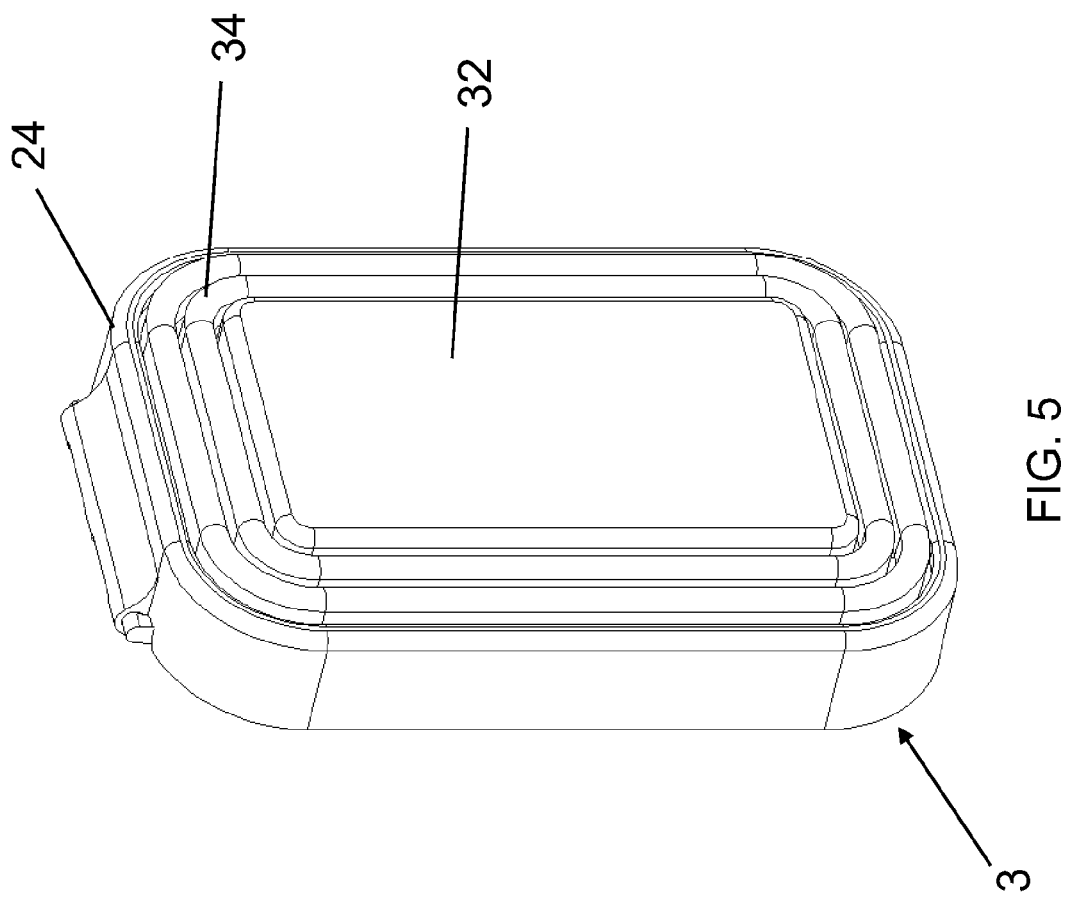
FIG. 5 is a perspective view of an electrical device cover including pleats in a retracted position.

Referring to FIG. 4, another particular implementation of an electrical device cover 3 is illustrated in an expanded position. In this particular implementation, the flexible element 32 includes at least one pleat 34 to allow the expansion of the lid 33 as it is closed. FIG. 5 illustrates the electrical device cover 3 shown in FIG. 4 in the retracted position. One example of a collapsible plastic flexible element may be found in the Rubbermaid® Collaspible® food storage containers currently available on the market and described at Rubbermaid.com. Similar construction, among many other types of construction, may be used to form a flexible element as described with reference to FIG. 4 including a form of pleats that enables the structure to remain in a collapsed position on its own. Those familiar with plastics manufacture will understand how to manufacture a flexible member having pleats as described in the various configurations herein from this description and reference to the Rubbermaid® Collaspible® food storage containers.

Figure 6:
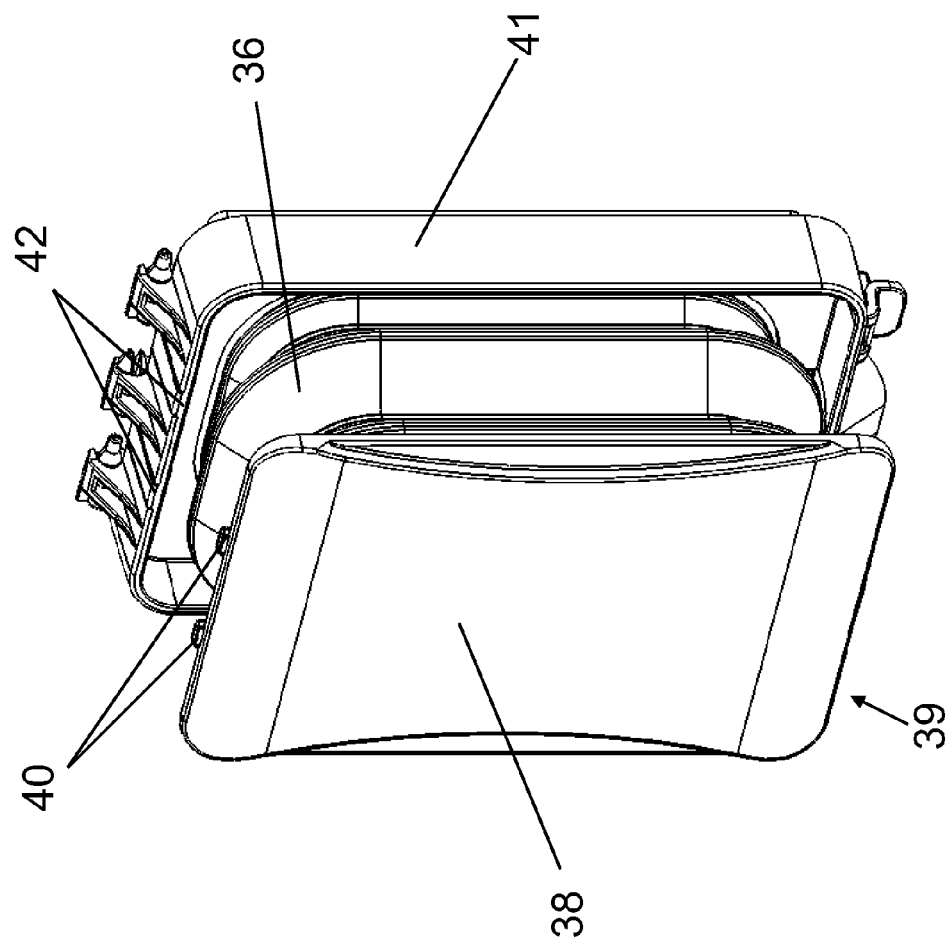
FIG. 6 is a perspective view of an electrical device cover including a hard front face in an expanded position.
Figure 7:
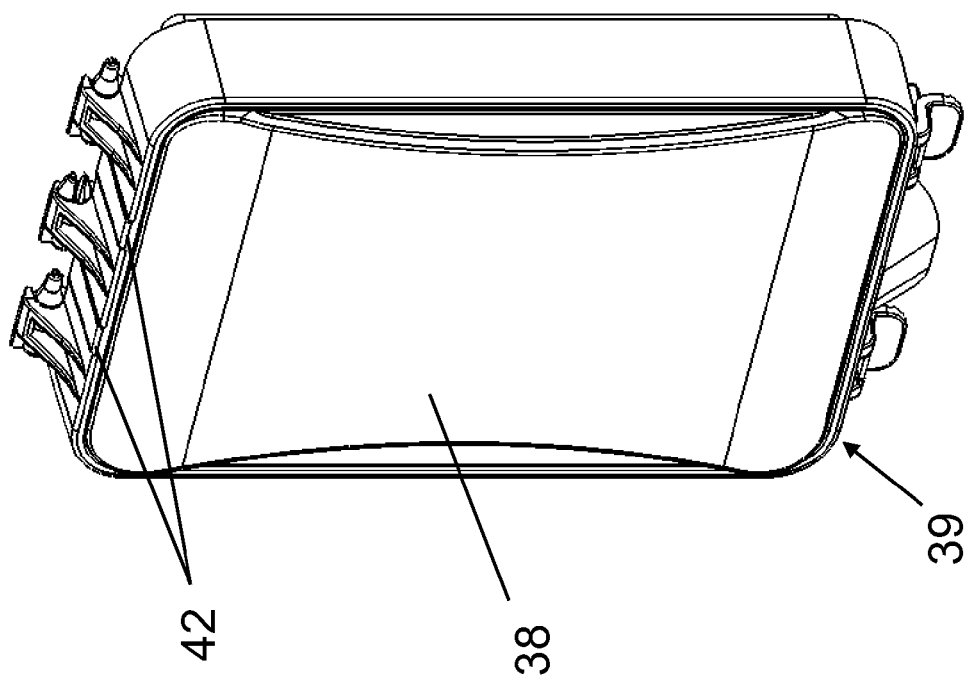
FIG. 7 is a perspective view of the electrical device cover of FIG. 6 is a retracted position.

FIG. 6 illustrates another particular implementation of an electrical device cover 39 in the expanded position. As illustrated, the flexible element 36 may be coupled with a front face 38 which may be a hard element. The front face 38 may also include a latching notch 40 along an edge configured to engage with a latching projection 42 on the lid ring 41. FIG. 7 illustrates the electrical device cover 39 in the retracted position with the latching notch 40 on the front face 38 engaged with the latching projection 42.

Figure 8:
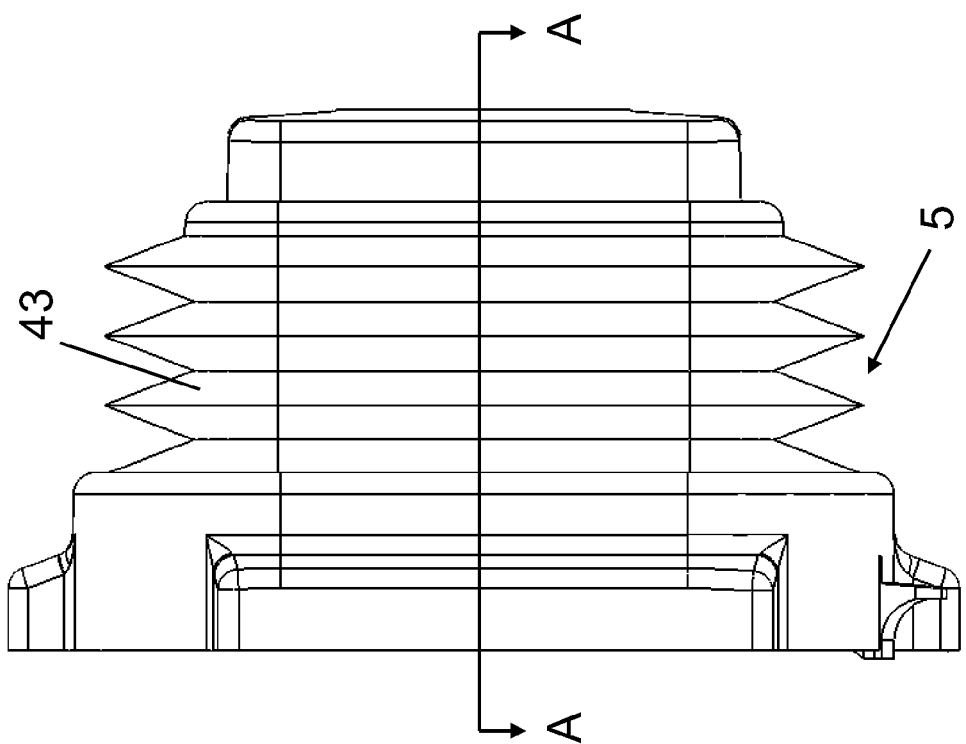
FIG. 8 is a top view of a lid of an electrical device cover showing the sectional line A.
Figure 9:
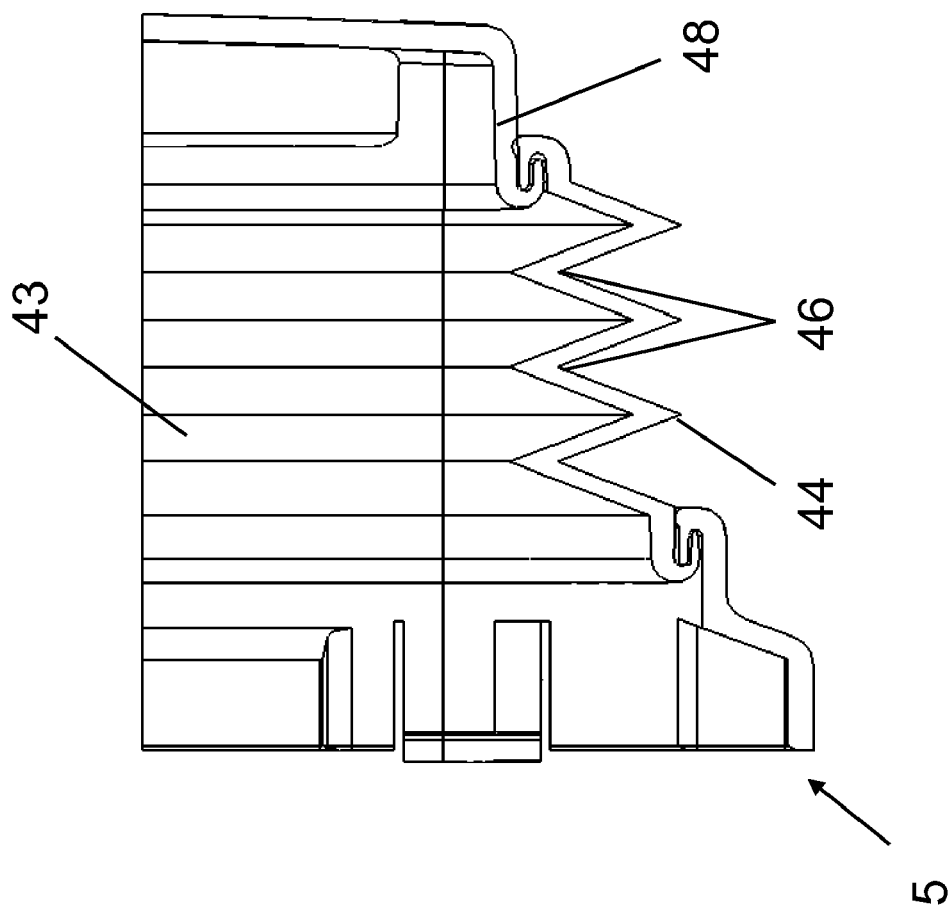
FIG. 9 is a cross sectional view of a particular implementation of a lid for an electrical device cover along the sectional line A.
Figure 10:
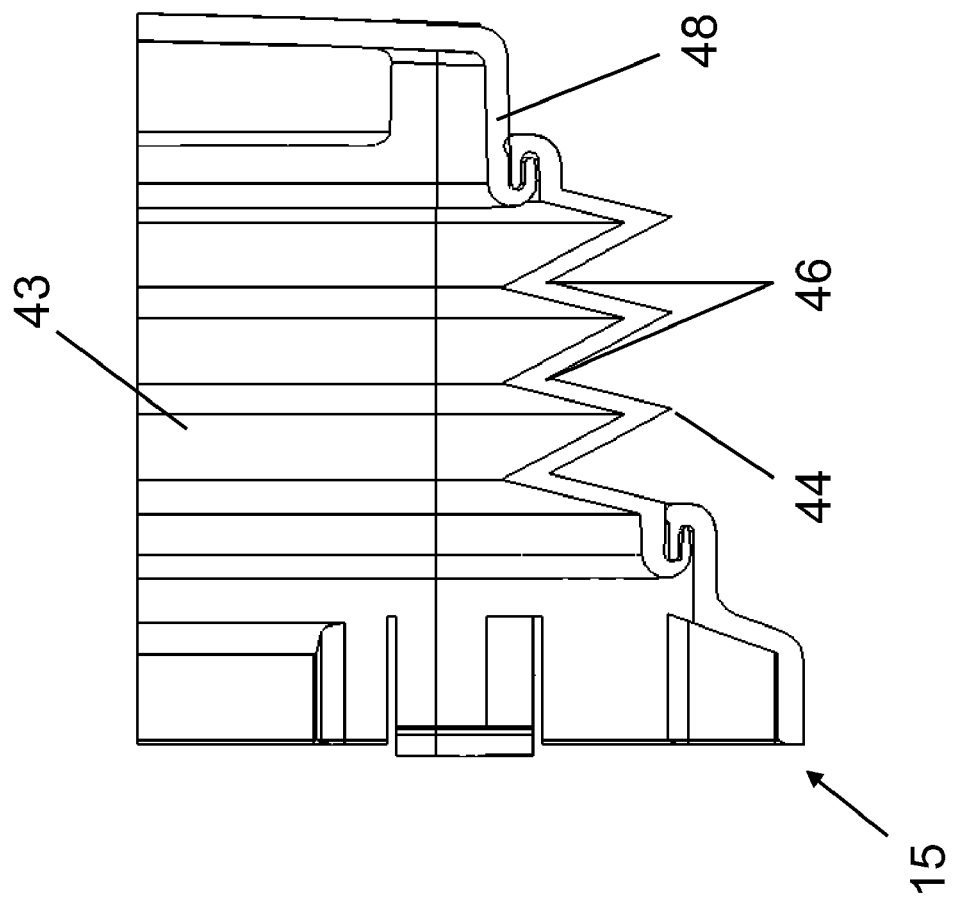
FIG. 10 is a cross sectional view of another particular implementation of a lid for an electrical device cover along the sectional line A.

Referring to FIG. 8, a top view of another particular implementation of a lid 5 is illustrated showing the sectional line A. FIG. 9 illustrates a cross section view of a particular implementation of a lid 5 along the sectional line A. As illustrated in FIGS. 8 and 9, the lid 5 includes a flexible element 43 that may include pleat structure formed by a pleat peak 44 between two peak valleys 46. In the particular implementation illustrated in FIG. 9, the pleat peak 44 is centered between the two peak valleys 46 and allows the lid face 48 to freely expand and contract between the expanded and retracted positions. FIG. 10 illustrates a cross section view similar to that of FIG. 9 taken along a similar section line of another particular implementation of a lid 15. The figure illustrates that in particular implementations, the pleat peak 44 may be aligned off-center between the pleat valleys 46 toward the lid face 48. This orientation of the pleat peak 44 may allow the lid 15 to be retained at the retracted position by forces provided through inducing the unequal curvature in the flexible element 43 on each side of the pleat peak 44 and the pleat valleys 46. To move the lid 15 to the extended position, the forces may be overcome by pulling the lid 15 outward with the lid face 48.

Figure 11:
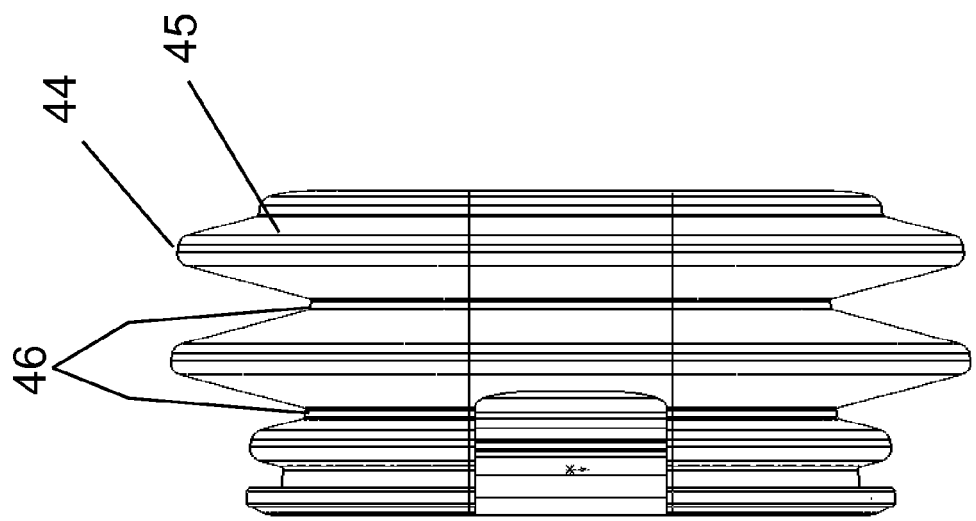
FIG. 11 is a bottom view of a portion of a lid for an electrical device cover showing the shape of the pleat peaks and pleat valleys.
Figure 12:
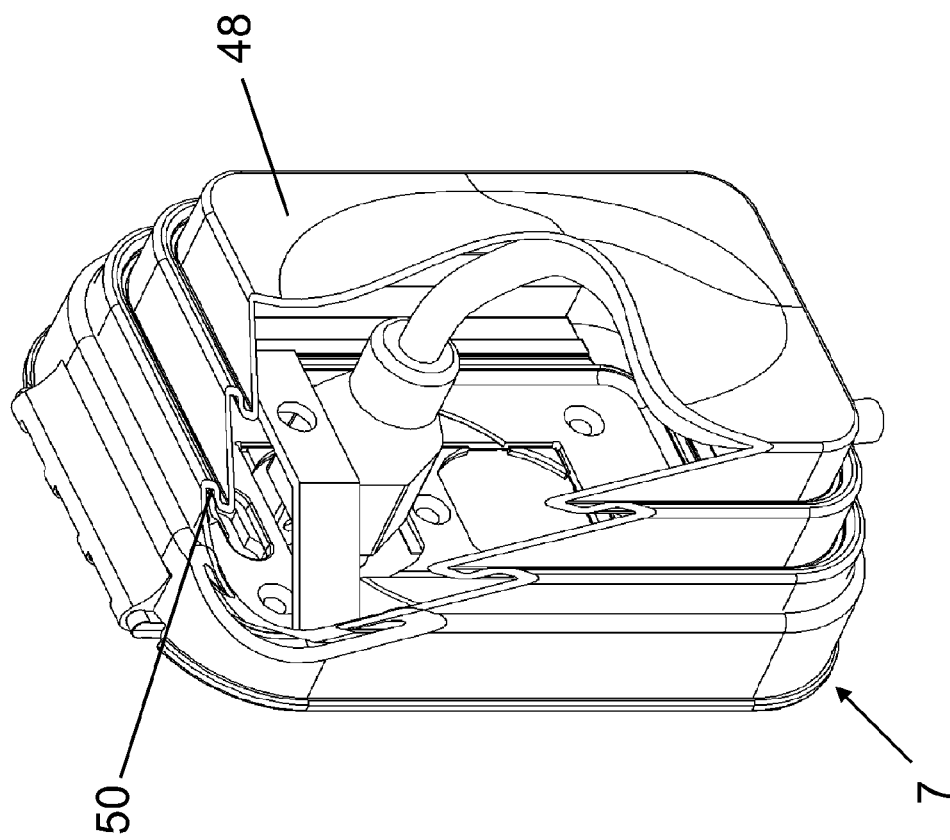
FIG. 12 is a cross section view of a particular implementation of an electrical device cover including flange shaped pleats.

Various other designs for pleat peaks 44 and pleat valleys 46 may be included in particular implementations of an electrical device cover. For example, FIG. 11 illustrates a flexible element 45 that includes a pleat peak 44 and pleat valleys 46 that are flattened rather than angled. FIG. 12 illustrates a particular implementation of an electrical device cover 7 that includes pleat peak 50 quite substantially biased toward the lid face 48, forming a pleat structure that is flange shaped. In alternate implementations, the pleat valleys may be biased toward or away the lid face. While in the implementations illustrated, the pleat structures included in the flexible element have been of a single type, particular implementations may include any type or combination of types of pleat structures.

Figure 14:
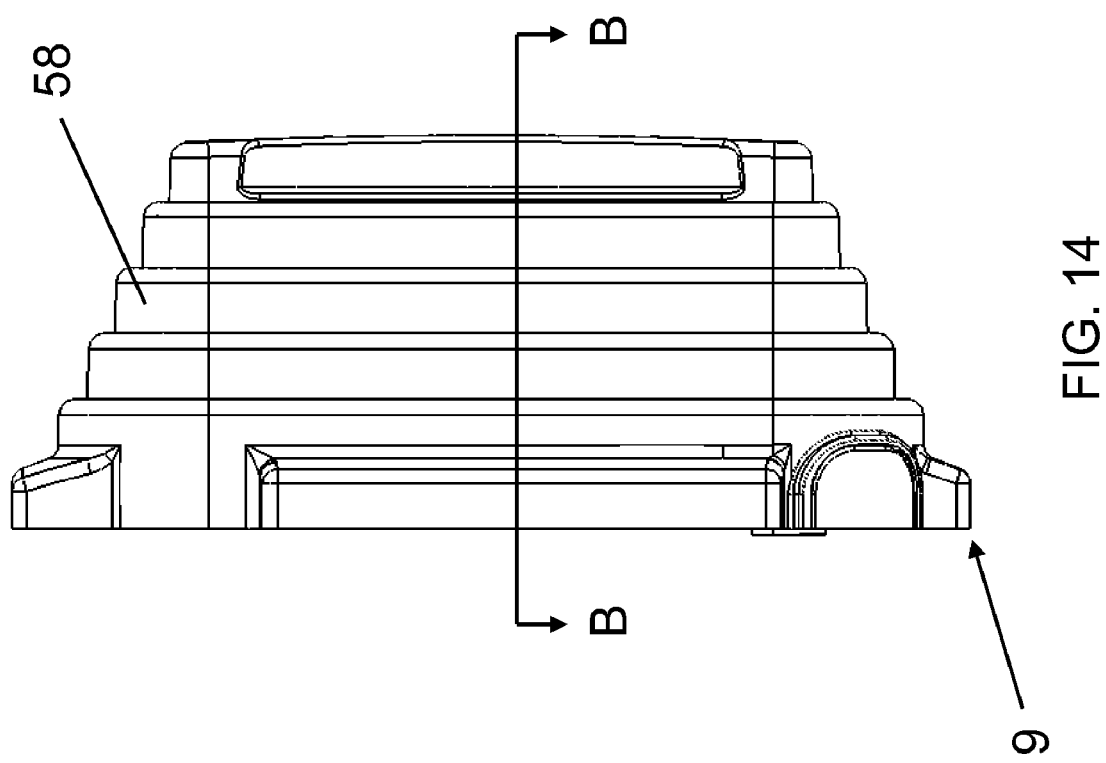
FIG. 14 is a top view of a lid for an electrical device cover showing the sectional line B.
Figure 15:
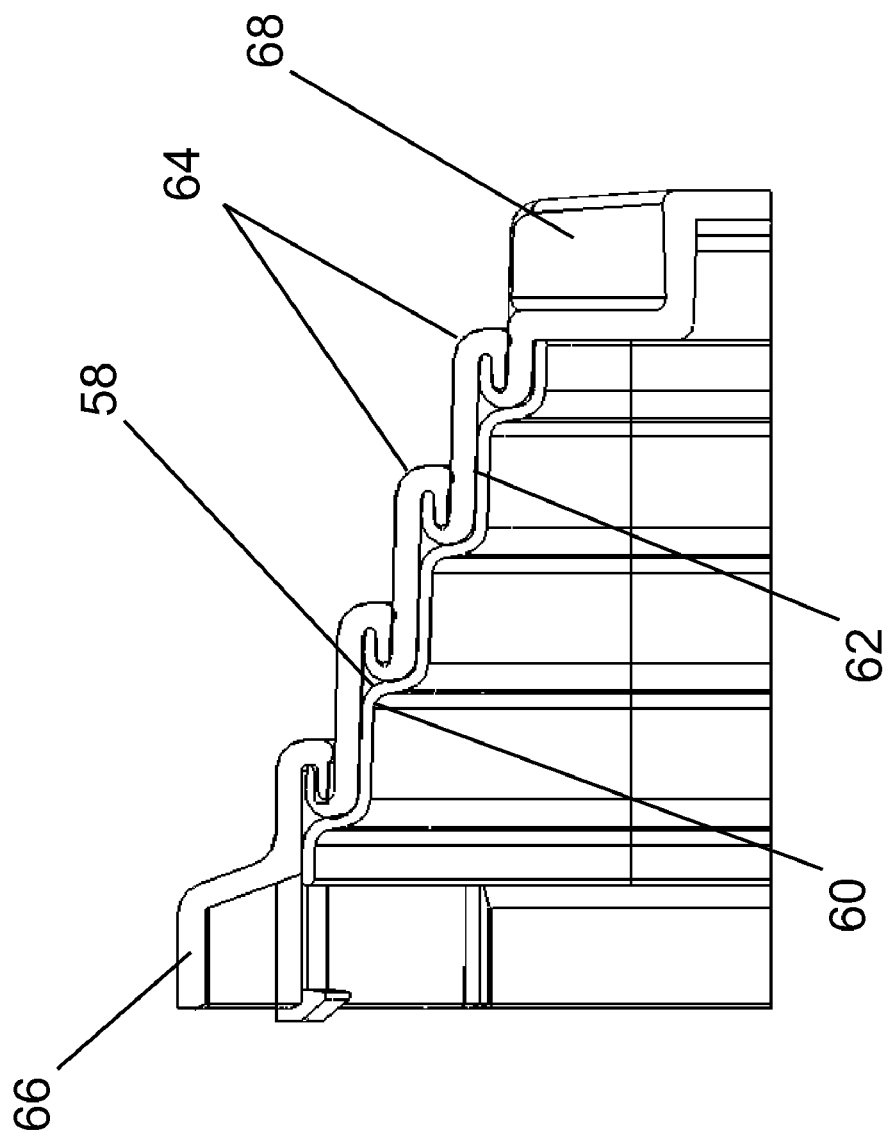
FIG. 15 is a cross section view of a lid for an electrical device cover along the sectional line B.

FIG. 14 illustrates another particular implementation of a lid 9 for an electrical device cover. FIG. 15 illustrates a cross section of the lid 9 shown in FIG. 14 along sectional line B. The flexible element 58 illustrated in FIG. 15 may include a flexible sheath 60 that runs along the inner surface 62 of a plurality of interlocking rings 64. The flexible sheath 60 may be coupled to all or a portion of the inner surface 62 of the interlocking rings 64 by adhesives, and the like, or may be free-standing. The interlocking rings 64 couple the lid face 68 with a lid ring 66. The flexible sheath 60 resists water and other contaminants from penetrating to the interior of the lid 9 through the interstices of the interlocking rings while the lid 9 is closed over an electrical connector. Like the other implementations discussed in this document, the flexible element 58 and the interlocking rings 64 permit the lid 5 to move both to an extended position and a retracted position depending on whether the a low profile or while-in-use application for the cover is desired.

Figure 16:
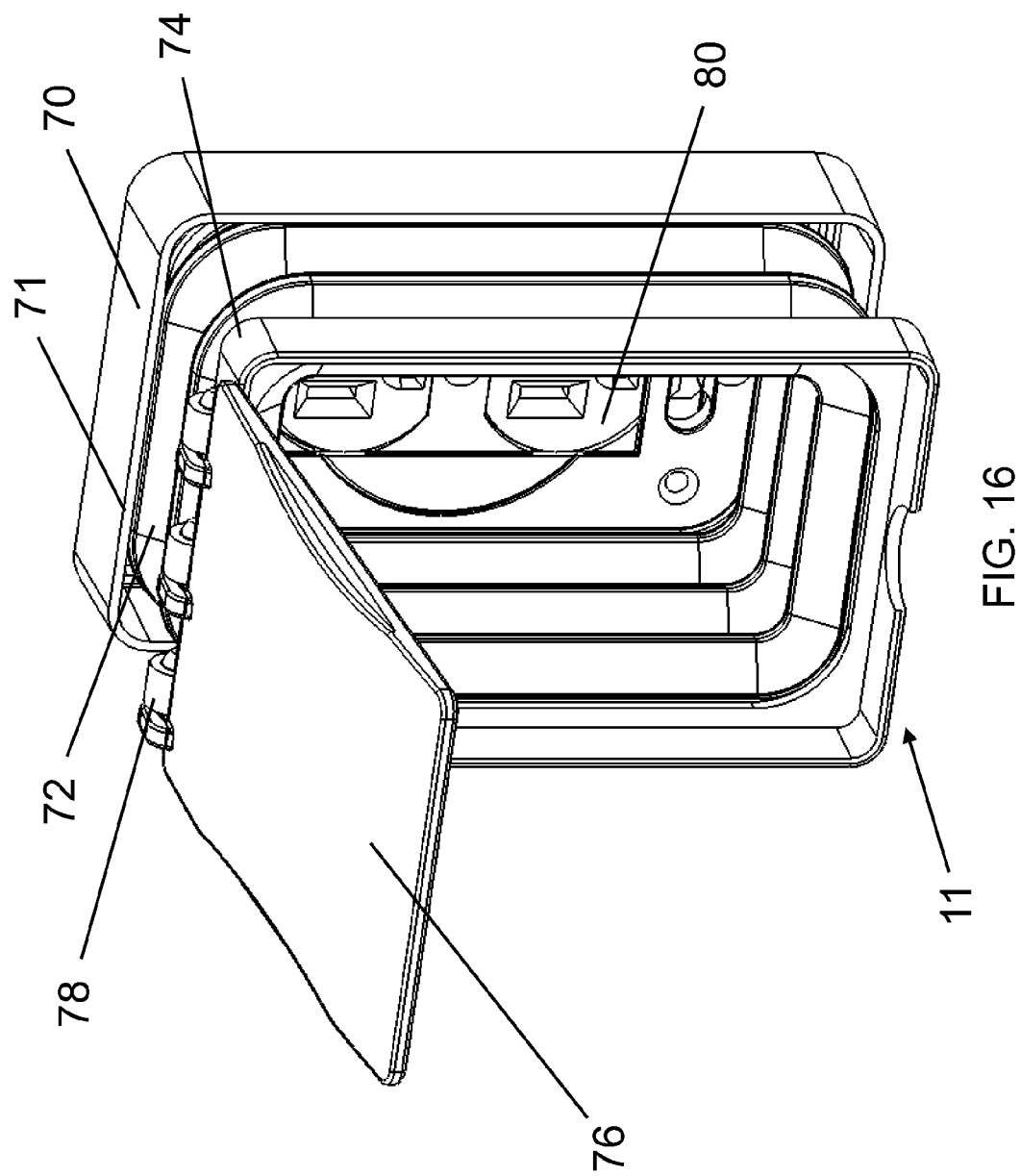
FIG. 16 is a perspective view of an electrical device cover with a base ring with the lid partially open

FIG. 16 illustrates another particular implementation of an electrical device cover 11. As illustrated, the electrical device cover 11 may include a base 70 that may have a flexible element 72 coupled to the base 70 around a majority of the base's 70 perimeter 71. A base ring 74 may be coupled to the flexible element 72, and a lid 76 may be movably coupled with the base ring 74 through a hinge 78. When the lid 76 is closed over the base 70, the flexible element 72 may be expanded to the expanded position to continuously enclose an electrical connector inserted into an electrical device 80 covered by the base 70. Similar to the other particular implementations disclosed in this document, the cover 11 can also be moved to the retracted position through the flexible element 72 coupled with the base 70.

Figure 13:
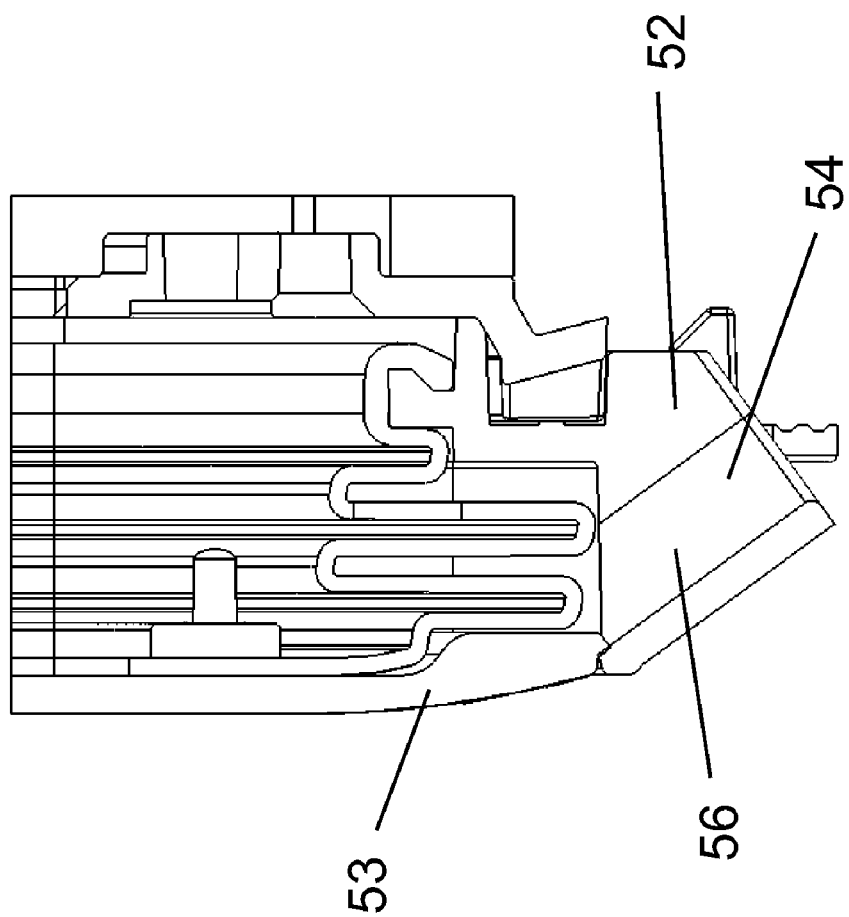
FIG. 13 is a cross section view of an electrical device cover showing a channel for a cord port angled toward the base.

The particular implementations disclosed in this document include cord ports in an edge of a surface of the electrical device cover. For example, the particular implementation shown in FIG. 1 includes a cord port 16 a surface of the lid 4. FIG. 13 illustrates a particular implementation of a cord port 54 that includes a channel 56 angled toward the base 52 of an electrical device cover similar to the implementation illustrated in FIG. 6. While the implementation shown in FIG. 13 has a channel 56 in the base 52, other particular implementations may have the channel in the lid 53 or in both the base 52 and the lid 53. Also, particular implementations of a cord port may include apertures that may be open or may be closed by a barrier intended to resist the ingress of water or other contaminants into the cover through the cord port. In addition, particular implementations of an electrical device cover may include a cord port that may be closed by a removable tab in the base 52, the lid 53, or both the base 52 and the lid 53. Removal of the removable tab by the user opens the apertures of the cord port and prepares them for use. Particular implementations of electrical device covers may also include a plurality of the cord ports described.

Particular implementations of an electrical device cover may also be configured to mount vertically or horizontally. This may involve the use of base and lid hinge members on adjacent sides such as that shown and described in U.S. Pat. No. 5,763,831 to Shotey et al., the disclosure of which is hereby incorporated herein by reference, a later version of horizontal and vertical hingeable cover known in the art, or even a corner hinge member such as that shown and described in U.S. Pat. No. 6,133,531 to Hayduke et al., the disclosure of which is hereby incorporated herein by reference. There are presently many possible hinge variations known in the art that permit horizontal and vertical mounting of electrical device covers all of which would be applicable here.

In addition, particular implementations of an electrical device cover may include a base that has at least one removable tab and may also include an adapter plate which may have one removable tab. Removal of the tabs in the base and/or the adapter plate may allow the cover to be configured for use with a first electrical device or converted to be configured for use with a different second electrical device. Relevant teachings regarding the structure and manufacture of electrical device covers with removable tabs in the base and in an adapter plate are found in U.S. Pat. No. 6,642,453 to Shotey, et al., the disclosure of which is hereby incorporated herein by reference.

Figure 17:
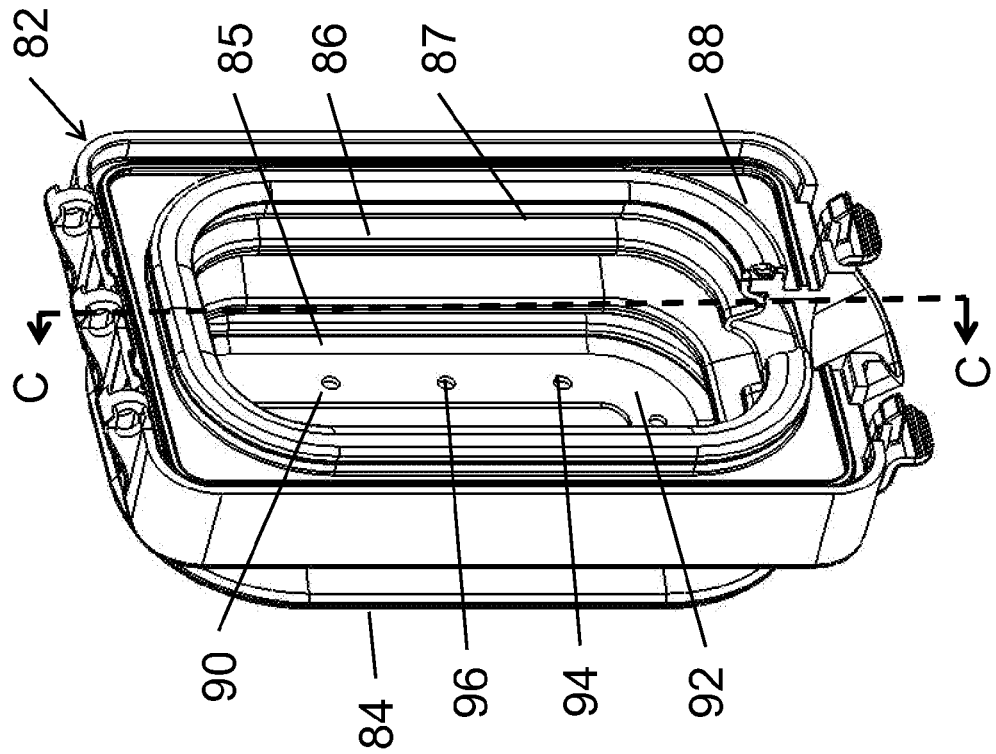
FIG. 17 is a rear perspective view of an electrical device cover with a lid ring coupled to a flexible member showing the sectional line C.

Referring to FIG. 17, a particular implementation of a lid 82 is illustrated, showing the sectional line C. As illustrated, the lid 82 may include a lid face 84 coupled to a first end 85 of the flexible element 86 and a lid ring 88 coupled to a second end 87 of the flexible element 86. The flexible element 86 may include a plurality of lid face mounting apertures 90 therethrough disposed along a perimeter of the first end 85. Implementations of a lid 82 may also include a retaining ring 92 having a plurality of retaining holes 94 corresponding to the plurality of lid face mounting apertures 90 on the perimeter of the first end 85 of the flexible element 86. A plurality of retaining projections 96 on the lid face 84 may extend through the retaining holes 94 and lid face mounting apertures 90. In particular implementations, a heat staking process may be used to melt the ends of the retaining projections 96 to prevent the removal of the retaining projections 96 through the retaining holes 94 and the lid face mounting apertures 90. In other particular implementations, no retaining ring 92 may be used, and a heat staking process may be used to couple the retaining projections 96 over the lid face mounting apertures 90 in the perimeter of the first end 85 of the flexible element 86. In other particular implementations, no retaining projections 96 or lid face mounting apertures 90 may be used; rather (or in addition to the retaining projections 96) the first end 85 of the flexible element 86 may be coupled with the lid face 84 through use of friction force, glue, adhesive, double sided tape or Velcro®.

Figure 18:
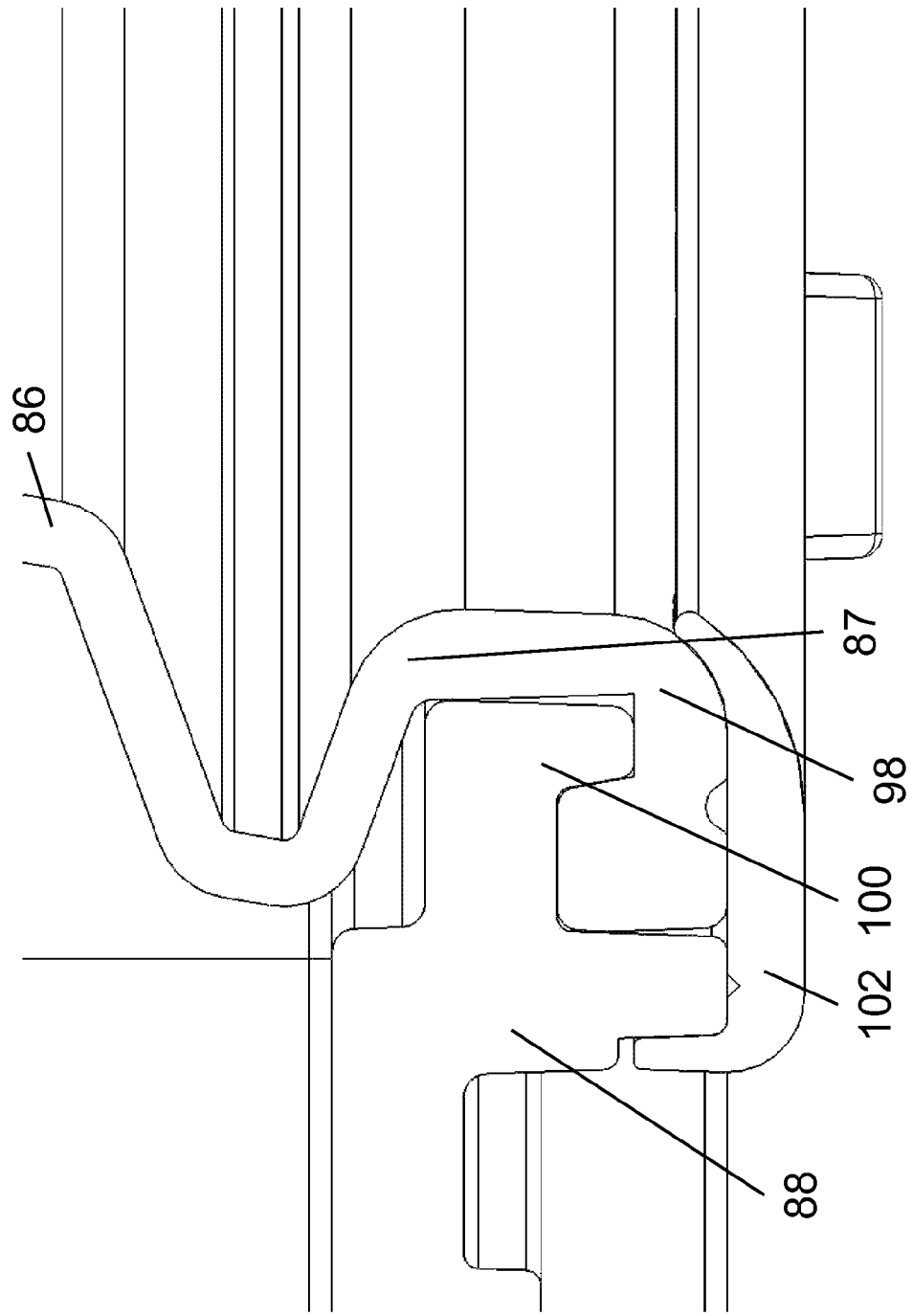
FIG. 18 is a cross section view of the intersection of a flexible member coupled to the lid ring along the sectional line C.
Figure 19:
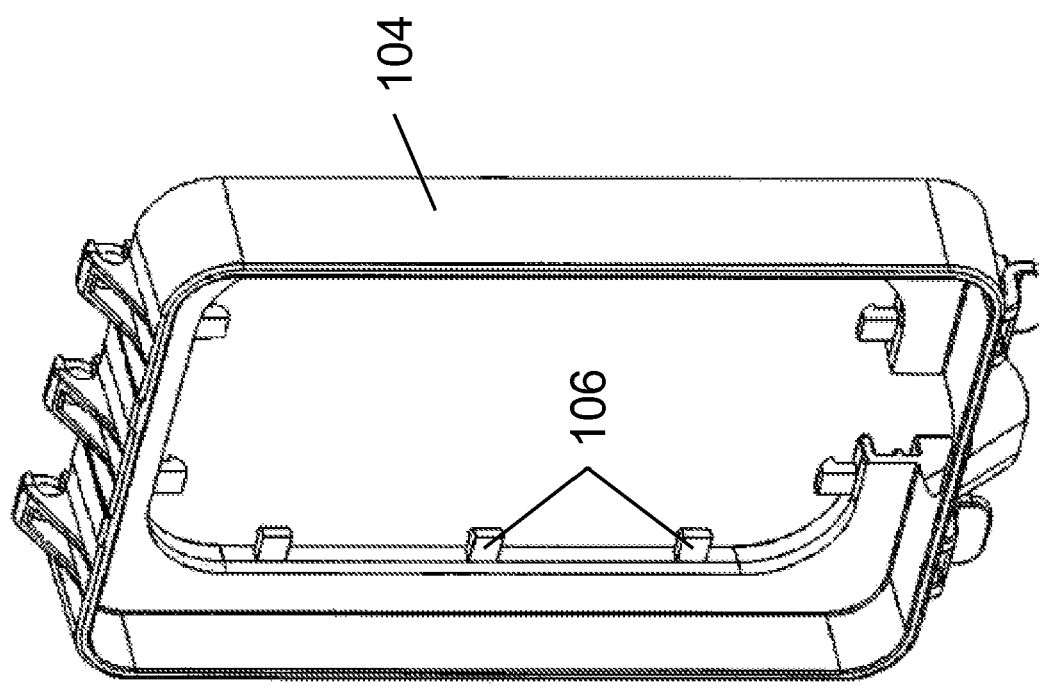
FIG. 19 is a front perspective view of a particular implementation of a lid ring.

Referring to FIGS. 18 and 19, a cross section view of the second end 87 of the flexible element 86 coupled with the lid ring 88 is illustrated. The second end 87 of the flexible element 86 may include a lid ring mounting pleat 98 extending around the majority of a perimeter of the second end 87. The lid ring mounting pleat 98 may be inserted over a plurality of mounting prongs 106 that extend inwardly from a perimeter of the lid ring 88 (see FIG. 19 for the position of the mounting prongs 106 in a particular implementation of a lid ring 104). In other particular implementations, the lid ring mounting pleat 98 may be inserted over a continuous ridge 100 that extends along a majority of the perimeter of the lid ring 88 (see FIGS. 17 and 18). The continuous ridge 100 may extend along the entire perimeter of the lid ring 88, may extend along only a portion, or may extend only in sections along the perimeter of the lid ring 88. The perimeter of the lid ring 88 referred to may be either the outer or inner perimeter of the lid ring 88. In particular implementations of a lid 82, the lid ring mounting pleat 98 may be held to the continuous ridge 100 through, by non-limiting example, friction force, glue, adhesive, double-sided tape, or Velcro®. In other particular implementations, the lid 82 may further, or alternatively, include a retainer ring 102 coupled along a majority of the perimeter of the lid ring 88 that is shaped to substantially cover the portion of the lid ring mounting pleat 98 that extends over the continuous ridge 100 (FIGS. 17 and 18) or mounting prongs 106 (FIG. 19). The retainer ring 102 may be coupled over the lid ring 88 after the lid ring mounting pleat 98 has been coupled over the continuous ridge 100 or mounting prongs 106. The retaining ring 102 may be coupled to the lid ring 88 through, by non-limiting example, glue, adhesive, heat stakes or other common techniques used to couple two parts together. In particular implementations, the retaining ring 102 may be coupled to the lid ring 88 through a sonic welding process, which allows the retaining ring 102, which may be composed of a plastic material, to be coupled to the lid ring 88, which may also be a plastic material, without being coupled to the flexible element 86 in the process, which may be formed of a rubber material.

The components included in a particular implementation of an electrical device cover may be formed of any of many different types of materials or combinations that can readily be formed into shaped objects and that are consistent with the intended operation of an electrical device cover. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the base, lid, flexible element and any other components forming a particular implementation of an electrical device cover may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components. For the exemplary purposes of this disclosure, the lid face 84 may be formed of a PVC material and coupled to the first end 85 of the flexible element 86 through a heat staking process. The flexible element 86 may be formed of a rubber material and may be coupled to the lid ring 88 that may be formed of a PVC material through a retainer ring 102 that may be formed of a PVC material by sonic welding of the retaining ring 102 to the lid ring 88.

It will be understood that implementations are not limited to the specific components disclosed herein, as virtually any components consistent with the intended operation of a method and/or system implementation for an electrical device cover may be utilized. Accordingly, for example, although particular bases, lids, and cord ports may be disclosed, such components may comprise any shape, size, style, type, model, version, class, grade, measurement, concentration, material, weight, quantity, and/or the like consistent with the intended operation of a method and/or system implementation for an electrical device cover may be used.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device cover configured for mounting over an electrical device, the electrical device cover comprising:

a lid comprising a lid face;
a flexible element, the flexible element coupled to the lid face at a first end of the flexible element;
a lid ring coupled to a second end of the flexible element, the lid ring movably coupled by a hinge to a base; and
a cord port in an edge of a surface of the cover;
wherein the flexible element comprises an expanded position where a majority of the flexible element is configured to extend beyond the lid ring and accommodate an electrical connector coupled with the electrical device with the lid is closed on the base.

2. The electrical device cover of claim 1, wherein the lid face comprises a plurality of retaining projections extending therefrom and the first end of the flexible element comprises a plurality of lid face mounting apertures therethrough disposed along a perimeter of the first end of the flexible element, and the first end of the flexible element is coupled to the lid face through insertion of the plurality of retaining projections into the lid face mounting apertures.

3. The electrical device cover of claim 2, wherein the first end of the flexible element is coupled to the lid face by heat staking.

4. The electrical device cover of claim 2, wherein a retainer ring comprising a plurality of retaining holes is coupled over the plurality of retaining projections after the plurality of retaining projections is inserted into the lid face mounting apertures.

5. The electrical device cover of claim 4, wherein the retainer ring and the first end of the flexible element are coupled to the lid face by heat staking or sonic welding.

6. The electrical device cover of claim 1, wherein the first end of the flexible element is coupled to the lid face by one of friction force, glue, adhesive, double-sided tape and Velcro®.

7. The electrical device cover of claim 1, wherein the second end of the flexible element further comprises a lid ring mounting pleat extending around a majority of a perimeter of the second end of the flexible element and the lid ring further comprises:
 a continuous ridge along a majority of a perimeter of the lid ring and the lid ring mounting pleat is inserted over the continuous ridge; or
 a plurality of mounting prongs extending inwardly from the perimeter of the lid ring and the lid ring mounting pleat is inserted over the plurality of mounting prongs.

8. The electrical device cover of claim 7, wherein the lid ring mounting pleat is held to the plurality of mounting prongs or to the continuous ridge through one of friction force, glue, adhesive, double-sided tape, or Velcro®.

9. The electrical device cover of claim 7, wherein a retainer ring is coupled along a majority of the perimeter of the lid ring over the lid ring mounting pleat.

10. The electrical device cover of claim 9, wherein the retainer ring is coupled to the lid ring through one of glue, adhesive, or heat staking.

11. The electrical device cover of claim 9, wherein the retainer ring is sonic welded to the lid ring.

12. An electrical device cover configured for mounting over an electrical device, the electrical device cover comprising: a lid comprising a substantially rigid lid face; a flexible element, the flexible element coupled to the lid face at a first end of the flexible element; a lid ring coupled to a second end of the flexible element, the lid ring movably coupled by a hinge to a base; and a cord port in an edge of a surface of the cover; wherein the flexible element is configured to expand to an expanded position and accommodate an electrical connector coupled with the electrical device with the lid closed over the base.

13. The electrical device cover of claim 12, wherein the lid face comprises a plurality of retaining projections extending therefrom and the first end of the flexible element comprises a plurality of lid face mounting apertures therethrough disposed along a perimeter of the first end of the flexible element, and the first end of the flexible element is coupled to the lid face through insertion of the plurality of retaining projections into the lid face mounting apertures.

14. The electrical device cover of claim 13, wherein the first end of the flexible element is coupled to the lid face by heat staking.

15. The electrical device cover of claim 13, wherein a retainer ring comprising a plurality of retaining holes is coupled over the plurality of retaining projections after the plurality of retaining projections is inserted into the lid face mounting apertures.

16. The electrical device cover of claim 15, wherein the retainer ring and the first end of the flexible element are coupled to the lid face by heat staking or sonic welding.

17. The electrical device cover of claim 12, wherein the first end of the flexible element is coupled to the lid face by one of friction force, glue, adhesive, double-sided tape and Velcro®.

18. The electrical device cover of claim 12, wherein the second end of the flexible element further comprises a lid ring mounting pleat extending around a majority of a perimeter of the second end of the flexible element and the lid ring further comprises:
 a continuous ridge along a majority of a perimeter of the lid ring and the lid ring mounting pleat is inserted over the continuous ridge; or
 a plurality of mounting prongs extending inwardly from the perimeter of the lid ring and the lid ring mounting pleat is inserted over the plurality of mounting prongs.

19. The electrical device cover of claim 18, wherein the lid ring mounting pleat is held to the plurality of mounting prongs or to the continuous ridge through one of friction force, glue, adhesive, double-sided tape, or Velcro®.

20. The electrical device cover of claim 18, wherein a retainer ring is coupled along a majority of the perimeter of the lid ring over the lid ring mounting pleat.

21. The electrical device cover of claim 20, wherein the retainer ring is coupled to the lid ring through one of glue, adhesive, or heat staking.

22. The electrical device cover of claim 20, wherein the retainer ring is sonic welded to the lid ring.

* * * * *